(12) United States Patent
Tien

(10) Patent No.: US 7,925,277 B2
(45) Date of Patent: Apr. 12, 2011

(54) POSITIONING SYSTEM OF POSITIONING WIRELESS COMMUNICATION APPARATUS

(75) Inventor: Kai-Wen Tien, Tainan (TW)

(73) Assignee: Quanta Computer Inc. (TW)

( * ) Notice: Subject to any disclaimer, the term of this patent is extended or adjusted under 35 U.S.C. 154(b) by 815 days.

(21) Appl. No.: 11/976,682

(22) Filed: Oct. 26, 2007

(65) Prior Publication Data

US 2008/0280629 A1  Nov. 13, 2008

(30) Foreign Application Priority Data

May 11, 2007  (TW) ............................... 96135066 A
May 11, 2007  (TW) ............................... 96207615 U

(51) Int. Cl.
*H04Q 7/20* (2006.01)
(52) U.S. Cl. ............... 455/456.5; 455/456.1; 455/456.2; 455/456.3; 455/456.4; 455/456.6
(58) Field of Classification Search .................. 455/421, 455/404.1, 404.2, 454.2, 141.2, 132.1, 456.1–456.6, 455/418, 433, 436, 440, 451, 338, 341
See application file for complete search history.

(56) References Cited

U.S. PATENT DOCUMENTS

| 6,826,240 | B1 * | 11/2004 | Thomas et al. |
| 7,663,544 | B2 * | 2/2010 | Thomas et al. ............... 342/361 |
| 2006/0046709 | A1 * | 3/2006 | Krumm et al. .............. 455/422.1 |
| 2006/0050625 | A1 * | 3/2006 | Krasner ........................ 370/208 |

* cited by examiner

*Primary Examiner* — Huy Phan
*Assistant Examiner* — Xiang Zhang
(74) *Attorney, Agent, or Firm* — Thomas, Kayden, Horstemeyer & Risley, LLP.

(57) ABSTRACT

The invention provides a positioning system of positioning a wireless communication apparatus. The positioning system transmits and receives positioning signals which have different frequency bands and generates corresponding positioning values according to the positioning signals. The positioning system then judges and selects positioning values which have less error from the generated positioning values, and calculates an average value of the selected positioning values. Therefore, positioning of the wireless communication apparatus will be more precise. Furthermore, if the positioning system is implemented in a radio-wave-based wireless communication environment, the N positioning signals can be polarized in a linear polarization way, a left-handed circular polarization way or a right-handed circular polarization way, so as to reduce the environmental impact to enhance precision of the positioning.

6 Claims, 2 Drawing Sheets

POSITIONING SYSTEM OF POSITIONING WIRELESS COMMUNICATION APPARATUS

BACKGROUND OF THE INVENTION

1. Field of the Invention

The invention relates to a positioning system of positioning a wireless communication apparatus and more particularly, to a positioning system capable of decreasing environmental impact so as to position a wireless communication apparatus more precisely.

2. Description of the Prior Art

In recent years, positioning technology for wireless communications is well developed and more extensively utilized. For example, positioning technology can be utilized in navigating system, location-based service system, mobile emergency positioning system, logistics management, fleet management, and so on.

Generally, a positioning system transmits a positioning signal to a wireless communication apparatus. Then, the positioning system will receive a returned signal from the wireless communication apparatus and generate, in accordance with the returned signal, a positioning value to position to the wireless communication apparatus. However, owing to topography, buildings and other impact factors, the positioning signal is often impacted to cause error of the positioning value so as to lower the precision of the positioning of the wireless communication apparatus (especially for environment-sensitive positioning algorithms such as a received signal strength positioning algorithm or an angle of arrival positioning algorithm).

According, a scope of the invention is to provide a positioning system of positioning a wireless communication apparatus to solve above problems.

SUMMARY OF THE INVENTION

A scope of the invention is to provide a positioning system of positioning a wireless communication apparatus.

According to an embodiment of the invention, the positioning system is used for positioning a wireless communication apparatus. The system includes a transmitting device, a receiving device and a processing device. The transmitting device is used for transmitting N signals, which each has a respective frequency band, to the wireless communication apparatus, where N is an integer larger than 6. The receiving device is used for receiving N returned signals, which each corresponds to one of the N transmitted signals, from the wireless communication apparatus. The processing device is electrically coupled to the receiving device. The processing device, firstly, generates N positioning values in accordance with the N returned signals. Then, the processing device divides the N positioning values into M groups of positioning values, where M is an integer larger than or equal to 3. Afterwards, the processing device selects K groups of positioning values from the M groups of positioning values in accordance with an error algorithm, where K is a positive integer less than or equal to M. Finally, the processing device calculates an average positioning value of the selected K groups of positioning values to position the wireless communication apparatus.

Therefore, the positioning system according to the invention is capable of transmitting and receiving positioning signals having different frequency bands so as to generate corresponding positioning values, and selecting more precise positioning values from the aforesaid positioning values to calculate an average positioning value. Thereby, the positioning of the wireless communication apparatus can be more precise.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
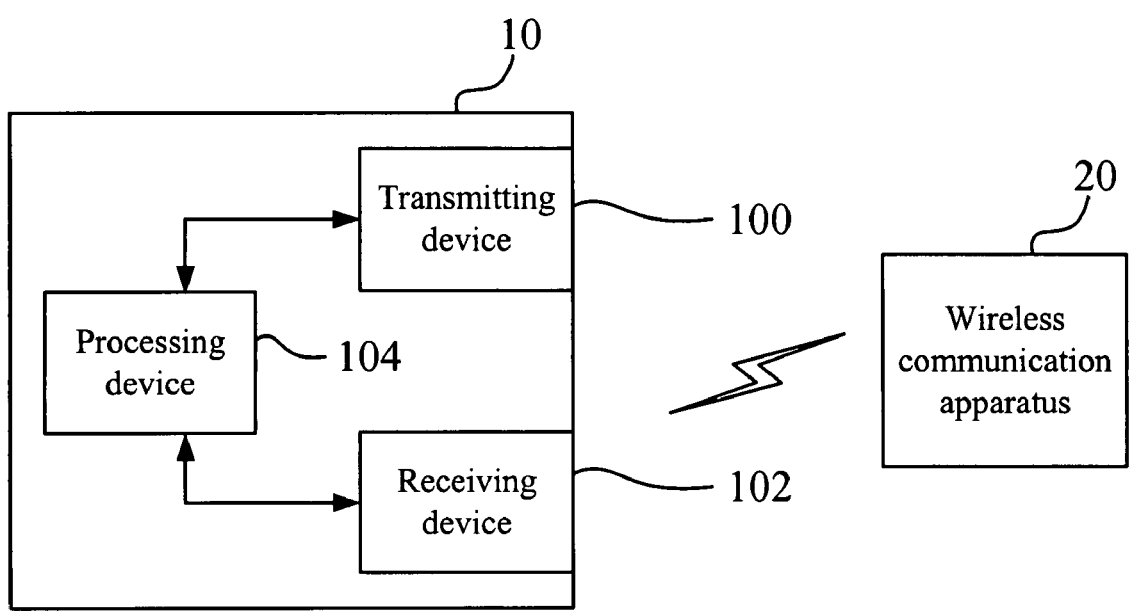
FIG. 1 shows a function block diagram of the positioning system according to an embodiment of the invention.

Please refer to FIG. 1. FIG. 1 shows a function block diagram of the positioning system 10 according to an embodiment of the invention. The positioning system 10 according to the invention is used for positioning a wireless communication apparatus 20. As shown in FIG. 1, the positioning system 10 includes a transmitting device 100, a receiving device 102 and a processing device 104. In the embodiment, the positioning system 10 can be, but not limited to, implemented as a base station system. The wireless communication apparatus 20 can be a personal computer, a notebook, a personal digital assistant, a navigation apparatus, a mobile phone, or other similar mobile or fixed wireless communication apparatus.

In the embodiment, the transmitting device 100 can transmit N signals, which each has a respective frequency band, to the wireless communication apparatus 20, where N is an integer larger than 6. The receiving device 102 can receive N returned signals, which each corresponds to one of the N transmitted signals, from the wireless communication apparatus 20. In addition, if the positioning system 10 is implemented in a radio-wave-based wireless communication environment, the N signals with multi-frequency-band can be transmitted in a multi-antenna way.

Figure 2:
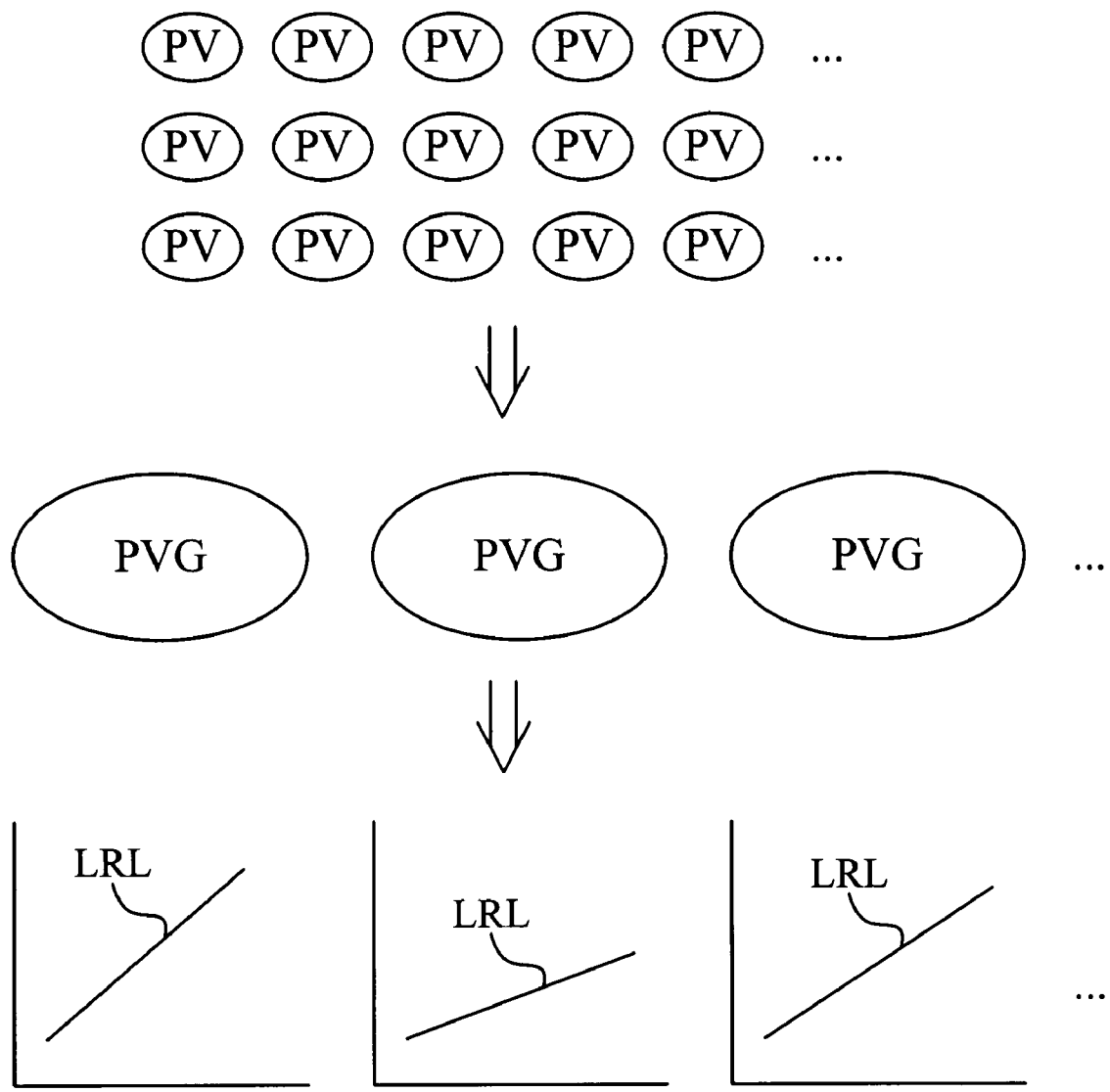
FIG. 2 shows how the processing device of FIG. 1 selects the groups of positioning values.

Please refer to FIG. 2. FIG. 2 shows how the processing device 104 of FIG. 1 selects the groups of positioning values PVG. The processing device 104 is electrically coupled to the receiving device 102. The processing device 104 can generate N positioning values PV in accordance with the N returned signals. As shown in FIG. 2, the processing device 104 can divides the N positioning values PV into M groups of positioning values PVG, where M is an integer larger than or equal to 3. Then, the processing device 104 can generate, by a least square algorithm, M linear regression lines LRL, which each corresponds to one of the M groups of positioning values PVG, according to the M groups of positioning values PVG.

Next, the processing device 104 can calculate a slope difference between each two of the M linear regression lines LRL, and select K groups of positioning values with less error from the M groups of positioning values according to the calculated slope differences, where K is a positive integer smaller than or equal to M. Finally, the processing device 104 calculates an average positioning value of the selected K groups of positioning values to position the wireless communication apparatus 20.

For example, if M is 3, that is, there are 3 groups of positioning values PVG, the processing device 104 can generate 3 corresponding linear regression lines LRL. Then, the processing device 104 can exclude the groups of positioning values PVG corresponding to the linear regression lines LRL with larger deviations, and select more precise groups of positioning values PVG to position the wireless communication apparatus 20.

Thereby, the positioning values having signals with frequency bands more easily impacted by the environment can be excluded, and the averaged positioning value can be more precise.

In real applications, if the positioning system is implemented in a radio-wave-based wireless communication environment, the N transmitted signal can be polarized in a linear polarization way, a left-handed circular polarization way or a right-handed circular polarization way. Since polarized signal can decrease environmental impact, the positioning value derived from the polarized signals can be more precise.

Comparing with prior art, the positioning system according to the invention is capable of transmitting and receiving positioning signals having different frequency bands so as to generate corresponding positioning values, and selecting more precise positioning values from the aforesaid positioning values to calculate an average positioning value. Thereby, the positioning of the wireless communication apparatus can be more precise. Furthermore, if the positioning system is implemented in a radio-wave-based wireless communication environment, the transmitted signals can be polarized in a linear polarization way, a left-handed circular polarization way or a right-handed circular polarization way to decrease environmental impact such that the positioning value derived from the polarized signals can be more precise. Therefore, positioning system of the invention can utilize a Received Signal Strength (RSS) positioning algorithm or an Angle of Arrival (AOA) positioning algorithm to enhance precision of the positioning.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A positioning system of positioning a wireless communication apparatus, said positioning system comprising:

a transmitting device for transmitting N signals, which each has a respective frequency band, to the wireless communication apparatus, N being an integer larger than 6;

a receiving device for receiving N returned signals, which each corresponds to one of the N transmitted signals, from the wireless communication apparatus; and a processing device, electrically coupled to the receiving device, for generating N positioning values in accordance with the N returned signals, dividing the N positioning values into M groups of positioning values where M is an integer larger than or equal to 3, selecting K groups of positioning values from the M groups of positioning values in accordance with an error algorithm where K is a positive integer less than or equal to M, and calculating an average positioning value of the selected K groups of positioning values to position the wireless communication apparatus, wherein the error algorithm comprises steps of: by the least square algorithm, generating M linear regression lines, which each corresponds to one the M groups of positioning values, according to the M groups of positioning values, and selecting K groups of positioning values from the M groups of positioning values according to the M slopes of the M linear regression lines.

2. The positioning system of claim 1, wherein the positioning system is implemented as a base station system.

3. The positioning system of claim 1, wherein the positioning system is implemented in a radio-wave-based wireless communication environment such that the N signals with multi-frequency-band are transmitted in a multi-antenna way.

4. The positioning system of claim 1, wherein the wireless communication apparatus is a mobile wireless communication system or a fixed wireless communication system.

5. The positioning system of claim 1, wherein the wireless communication apparatus utilizes a Received Signal Strength (RSS) positioning algorithm or an Angle of Arrival (AOA) positioning algorithm to enhance precision of the positioning.

6. The positioning system of claim 1, wherein as the positioning system is implemented in a radio-wave-based wireless communication environment, the N transmitted signals are polarized in at least one selected from the group consisting of a linear polarization way, a left-handed circular polarization way and a right-handed circular polarization way.

* * * * *